(12) United States Patent
Suter et al.

(10) Patent No.: US 10,662,798 B2
(45) Date of Patent: May 26, 2020

(54) DRY GAS SEALING SYSTEM, AND TURBOMACHINE COMPRISING A DRY GAS SEALING SYSTEM

(71) Applicant: MAN DIESEL & TURBO SE, Augsburg (DE)

(72) Inventors: Roger Suter, Zürich (CH); Michael Betschart, Vitznau (CH)

(73) Assignee: MAN Energy Solutions SE, Augsburg (DE)

( * ) Notice: Subject to any disclaimer, the term of this patent is extended or adjusted under 35 U.S.C. 154(b) by 28 days.

(21) Appl. No.: 15/769,979

(22) PCT Filed: Oct. 20, 2016

(86) PCT No.: PCT/EP2016/075284
§ 371 (c)(1),
(2) Date: Apr. 20, 2018

(87) PCT Pub. No.: WO2017/068073
PCT Pub. Date: Apr. 27, 2017

(65) Prior Publication Data
US 2018/0298775 A1    Oct. 18, 2018

(30) Foreign Application Priority Data

Oct. 22, 2015    (DE) .................. 10 2015 013 659

(51) Int. Cl.
*F01D 11/04*    (2006.01)
*F01D 25/32*    (2006.01)
(Continued)

(52) U.S. Cl.
CPC .............. *F01D 11/04* (2013.01); *B01D 45/14* (2013.01); *F01D 25/002* (2013.01); *F01D 25/32* (2013.01);
(Continued)

(58) Field of Classification Search
CPC ........ F01D 11/04; F01D 25/002; F01D 25/32; B01D 45/14; F05D 2240/55; F05D 2240/61; F05D 2260/607
(Continued)

(56) References Cited

U.S. PATENT DOCUMENTS 2,010,930 A    8/1935    Rowe
2,464,136 A    3/1949    Jenkins
(Continued)

FOREIGN PATENT DOCUMENTS

DE    2646475    12/1977
EP    2 631 489    8/2013
(Continued)

OTHER PUBLICATIONS

Office Action dated Jun. 3, 2019 issued in Japanese Patent Application No. 2018-520585.
(Continued)

*Primary Examiner* — J. Todd Newton
(74) *Attorney, Agent, or Firm* — Cozen O'Connor

(57) ABSTRACT

Dry gas sealing system for a turbomachine, in particular a turbocompressor, having at least one dry gas seal for sealing a part located on the rotor side of the turbomachine from a part located on the stator side of the turbomachine, and a purifying device for purifying process gas that is extracted from the turbomachine and can be fed to the or each dry gas seal as purified sealing gas following the purification process; the purifying device is designed as a centrifugal device that is integrated into the part located on the rotor side of the turbomachine.

13 Claims, 2 Drawing Sheets

(51) Int. Cl.
  *B01D 45/14*  (2006.01)
  *F01D 25/00*  (2006.01)

(52) U.S. Cl.
  CPC ...... *F05D 2240/55* (2013.01); *F05D 2240/61* (2013.01); *F05D 2260/607* (2013.01)

(58) Field of Classification Search
  USPC ....................................................... 415/170.1
  See application file for complete search history.

(56) References Cited

U.S. PATENT DOCUMENTS

| | | | |
|---|---|---|---|
| 3,217,655 A * | 11/1965 | Sercy | F04D 15/00 |
| | | | 415/116 |
| 3,743,303 A | 7/1973 | Pope | |
| 4,082,296 A | 4/1978 | Stein | |
| 4,084,825 A * | 4/1978 | Ludwig | F01D 11/02 |
| | | | 277/348 |
| 4,453,722 A | 6/1984 | Swanson | |
| 4,993,917 A * | 2/1991 | Kulle | F01D 3/04 |
| | | | 277/361 |
| 5,954,341 A | 9/1999 | Ringer et al. | |
| 7,232,286 B2 | 6/2007 | Shinozaki | |
| 7,789,636 B2 | 9/2010 | Liebl et al. | |
| 8,753,014 B2 | 6/2014 | Devitt | |
| 8,807,914 B2 | 8/2014 | Shinozaki | |
| 8,888,105 B1 * | 11/2014 | Andrews | F16J 15/363 |
| | | | 277/358 |
| 9,145,783 B2 * | 9/2015 | Delrahim | F01D 11/06 |
| 9,441,668 B2 | 9/2016 | Devitt | |
| 9,581,248 B2 | 2/2017 | Itadani et al. | |
| 10,234,036 B2 | 3/2019 | Lewis | |
| 10,344,608 B2 | 7/2019 | Gaia et al. | |
| 2003/0201606 A1 | 10/2003 | Shinozaki | |
| 2007/0140815 A1 | 6/2007 | Shinozaki | |
| 2009/0067977 A1 | 3/2009 | Shinozaki | |
| 2009/0324391 A1 | 12/2009 | Maier | |
| 2010/0135769 A1 * | 6/2010 | Kleynhans | F04D 29/284 |
| | | | 415/58.4 |
| 2013/0188895 A1 | 7/2013 | Devitt | |
| 2013/0195649 A1 | 8/2013 | Kitano et al. | |
| 2014/0062027 A1 | 3/2014 | Neuberger et al. | |
| 2014/0161587 A1 * | 6/2014 | Shamseldin | F04D 29/124 |
| | | | 415/1 |
| 2014/0225325 A1 * | 8/2014 | Bardon | F04D 29/12 |
| | | | 277/303 |
| 2014/0286599 A1 | 9/2014 | Devitt et al. | |
| 2014/0294329 A1 | 10/2014 | Devitt | |
| 2015/0118018 A1 | 4/2015 | Baldassarre et al. | |
| 2015/0211638 A1 | 7/2015 | Itadani et al. | |
| 2015/0226336 A1 * | 8/2015 | Kirchner | F16J 15/3412 |
| | | | 277/411 |
| 2016/0201805 A1 | 7/2016 | Lewis | |
| 2016/0281856 A1 | 9/2016 | Itadani et al. | |
| 2017/0051832 A1 | 2/2017 | Baumann et al. | |
| 2017/0254341 A1 * | 9/2017 | Bertoneri | F01D 11/02 |
| 2018/0187566 A1 | 7/2018 | Gaia et al. | |
| 2018/0266265 A1 * | 9/2018 | Gerbi | F16J 15/40 |
| 2019/0162311 A1 | 5/2019 | Lewis | |

FOREIGN PATENT DOCUMENTS

| | | |
|---|---|---|
| JP | 52-144560 | 12/1977 |
| JP | 2011-522175 | 7/2011 |
| JP | 2011-231880 | 11/2011 |
| JP | 2012-107609 | 6/2012 |
| JP | 2013-122185 | 6/2013 |
| JP | 2015-520317 | 7/2015 |
| RU | 2537116 C2 | 12/2014 |
| WO | WO 2009/143213 A2 | 11/2009 |
| WO | WO 2009/158252 | 12/2009 |
| WO | WO 2013/160416 | 10/2013 |

OTHER PUBLICATIONS

Office Action dated May 13, 2019 issued in Japanese Patent Application No. 2018-520586.
Office Action dated Jul. 5, 2019 issued in Chinese Patent Application No. 201680061736.7.
Office Action dated Jun. 11, 2019 issued in Russian Patent Application No. 2018118614/06.
Office Action dated Sep. 4, 2019 issued in U.S. Appl. No. 15/770,013.
Office Action dated Oct. 24, 2019 issued in U.S. Patent India Patent Application No. 201847014982.
Office Action dated Feb. 18, 2020 issued in U.S. Appl. No. 15/770,013.
Office Action dated Dec. 26, 2019 issued in India Patent Application No. 201847014890.

* cited by examiner

DRY GAS SEALING SYSTEM, AND TURBOMACHINE COMPRISING A DRY GAS SEALING SYSTEM

CROSS REFERENCE TO RELATED APPLICATIONS

This is a U.S. national stage of application No. PCT/EP2016/075284, filed on Oct. 20, 2016. Priority is claimed on German Application No. DE102015013659.3, filed Oct. 22, 2015, the content of which is incorporated here by reference.

BACKGROUND OF THE INVENTION

1. Field of the Invention

The invention relates to a dry gas sealing system for a turbomachine and to a turbomachine comprising such a dry gas sealing system.

2. Description of the Prior Art

In turbomachines, such as for example turbocompressors, dry gas seals are increasingly employed that supersede conventional oil film seals for sealing a rotor-side component of the turbomachine relative to a stator-side component of the turbomachine.

FIGS. 1 and 2 show details of a dry gas sealing system known from the prior art, which serves for sealing a rotor-side component 2 of a turbomachine relative to a stator-side component 3 of the same. In FIG. 1, two dry gas seals 4 are shown that seal the rotor-side component 2 relative to the stator-side component 3, wherein each of the dry gas seals 4 comprises a sealing device 5 consisting of a rotor-side sealing element 5 and a stator-side sealing element 7. The respective stator-side sealing element 7 of the sealing device 5 of the respective dry gas seal 4 is fastened to a stator-side support device 8 of the respective dry gas seal 4 and is pressed or pushed against the rotor-side sealing element 6 with a defined force via a spring element 9, which is supported between the respective stator-side support device 8 and the stator-side component. Because of this, the stator-side sealing element 7 lies against the rotor-side sealing element 6 in a defined manner.

Thus, each of the dry gas seals 4 of the dry gas sealing system is supplied on the one hand with so-called seal gas 10, wherein the seal gas 10 is cleaned process gas 11, which is extracted from the turbomachine 12 and conducted via a cleaning device 13 for cleaning. Furthermore, each dry gas seal 4 is supplied with two further gas flows, namely buffer gas 14 and separation gas 15. The buffer gas 14 and separation gas 15 are for example $N_2$, which is kept ready in a storage tank 25 and following conditioning is supplied to the respective dry gas seal 4 via a suitable regulating device 26.

The gas recirculations of a dry gas seal are a leakage 16 of the seal gas 10, which is recirculated to the turbomachine 12 and thus to the process, a leakage 17 of a mixture of seal gas 10 and buffer gas 14, which is also called inner leakage, a leakage 18 of a mixture of buffer gas 14 and separation gas 15, which is also called outer leakage, a leakage 19 of the separation gas 15 to the bearing, which is also called bearing leakage.

Accordingly, as already explained above, it is necessary with dry gas sealing systems to extract process gas 11 from the process, i.e. the turbomachine, clean the same in a cleaning device 13 and supply the cleaned process gas 11 to the respective dry gas seal 4 as seal gas 10. In dry gas sealing system known from the prior art, the conditioning of cleaning of the process gas 11 is performed in external filters.

SUMMARY OF THE INVENTION

There is a need for simplifying the construction of a dry gas sealing system. The invention is therefore based on the object of creating a dry gas sealing system with a simpler construction.

This object is solved through a dry gas sealing system, which according to one aspect of the invention, the cleaning device is embodied as a centrifugal device integrated in the rotor of the turbomachine.

With the present invention, an external cleaning device in the form of a filter device for conditioning the process gas extracted from the turbomachine, which is used as seal gas, can be omitted. It is rather proposed according to one aspect of the invention to integrate a cleaning device designed as a centrifugal device in the rotor of the turbomachine, which assumes the cleaning of the cleaning process gas for providing the cleaned seal gas. Since an external cleaning device becomes superfluous, the construction of the dry gas sealing system can be simplified. The costs, complexity and susceptibility to faults of the dry gas sealing system are reduced.

According to an advantageous further development, the centrifugal device is integrated in a shaft of the rotor of the turbomachine, wherein the shaft preferentially comprises at least one inlet opening for the process gas, at least one radial outlet bore for seal gas for each dry gas seal, and at least one radial outlet bore for contaminations. By integrating the centrifugal device in the shaft of the rotor, a particularly advantageous conditioning of the process gas for providing cleaned seal gas is possible. A further advantage is that through a hollow-drilled rotor or a hollow-drilled shaft a better rotor dynamic can be achieved. Furthermore, existing turbomachines can be easily retrofitted or converted.

According to an advantageous further development, the dry gas sealing system comprises an external storage tank for seal gas. With the external storage tank seal gas it is ensured that with stationary rotor of the turbomachine the sealing function of the or each dry gas seal can be maintained.

According to an advantageous further development, the dry gas sealing system comprises a heating bore in the stator and/or housing cover. By way of this heating bore a so-called freezing or sticking of the dry gas seal can be prevented.

According to a further advantageous further development, the cleaning device in the rotor comprises a suitable washing device (not shown) with an external liquid, wherein this liquid is supplied for example via the inlet bore, optionally also with additional nozzle. The dirty washing water is discharged via one or more outlet bores.

BRIEF DESCRIPTION OF THE DRAWINGS

Preferred further developments of the invention are obtained from the subclaims and the following description. Exemplary embodiments of the invention are explained in more detail by way of the drawing without being restricted to this. It shows:

DETAILED DESCRIPTION OF THE PRESENTLY PREFERRED EMBODIMENTS

Figure 1:
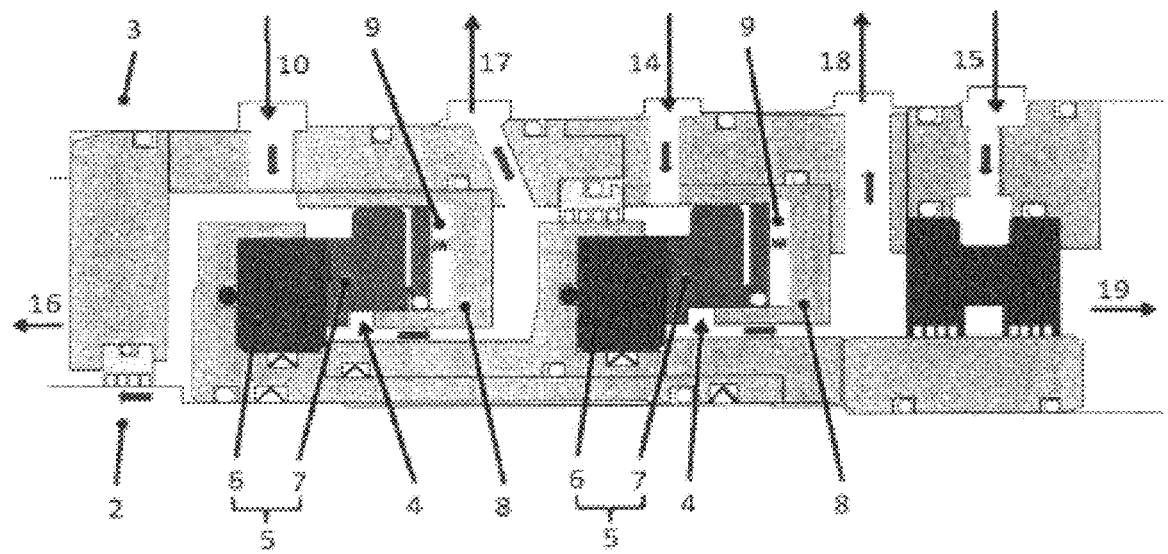
FIG. 1: is a schematic axial section through a turbomachine in the region of a dry gas sealing system without equipment according to the prior art.
Figure 2:
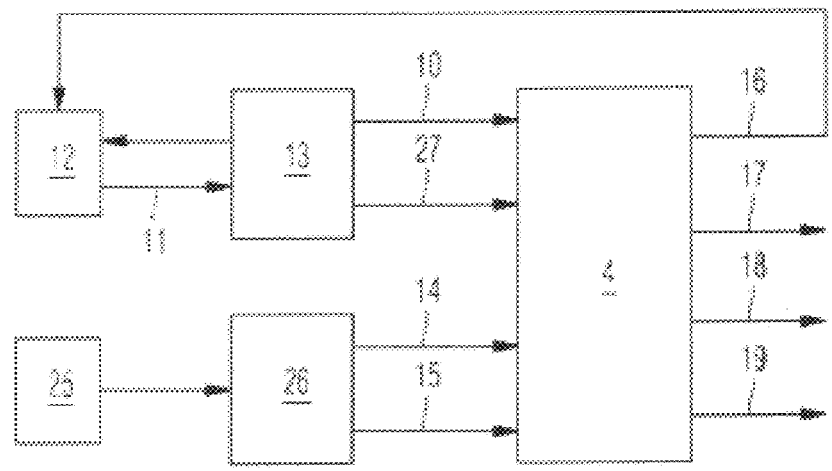
FIG. 2: is a block diagram of a dry gas sealing system with equipment according to the prior art.

The invention relates to a dry gas sealing system 1 of a turbomachine, in particular of a turbocompressor, and to a turbomachine with a dry gas sealing system 1.

A dry gas sealing system 1 comprises at least one dry gas seal 4, which serves for sealing a rotor-side component 2 of the turbomachine, in the following called rotor 2, relative to a stator-side component 3 of the turbomachine, in the following called stator or housing.

Figure 3:
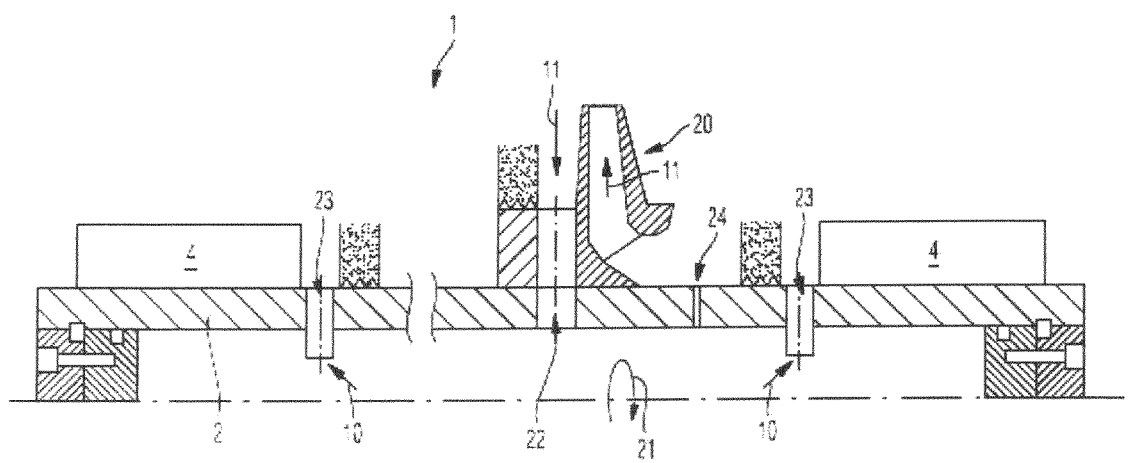
FIG. 3: is a schematic axial section through a turbomachine with a dry gas sealing system according to one aspect of the invention.

FIG. 3 shows a cross section through a turbomachine in the region of a dry gas sealing system 1 according to one aspect of the invention, wherein of the dry gas sealing system 1 dry gas seals 4 are shown which seal the rotor 2 of the turbomachine relative to the stator 3 or housing which is not shown in FIG. 3. In FIG. 3, an impeller 20 received by the rotor 2 is shown, which serves for guiding the flow of the process gas.

As already explained, process gas 11 in dry gas sealing systems is extracted, cleaned and supplied to the dry gas seals 4 as cleaned seal gas 10.

In terms of the present invention, a cleaning device, which serves for cleaning the process gas 11 for providing the seal gas 10, is integrated in the rotor 2 of the turbomachine and embodied as centrifugal device which utilises the rotational energy of the rotor 2 rotating in the direction of the arrow 21 in order to separate contaminations and/or liquids from the process gas 11 thus extracting cleaned seal gas 10 from the process gas 11.

Here, the centrifugal device is integrated in the shaft of the rotor 2 of the turbomachine, wherein this shaft 2 comprises at least one inlet aperture 22 for the process gas 11, for each of the dry gas seals 4 at least one outlet aperture 23 for cleaned seal gas 10 and at least one outlet aperture 24 for contaminations separated from the process gas 11.

According to one aspect of the invention, centrifugal forces are accordingly utilised in order to remove contaminations from the process gas 11 and thus provide cleaned seal gas 10 for the dry gas seals 4.

Because of the centrifugal forces and the flow conditions in the compressor, initial contaminations are already removed from the process gas 11 upstream of the inlet bore 22 so that the same cannot enter the interior of the shaft or of the rotor in the first place. Further contaminations are separated from the process gas within the rotor or the shaft 2 and discharged via the or each outlet aperture 24. Cleaned process gas and thus seal gas 10 can then be supplied to the dry gas seals 4 via the outlet bores 23.

According to an advantageous further development, an external storage tank (not shown) for cleaned seal gas 10 is present that during the normal operation with rotating rotor 2 can be filled with cleaned seal gas 10 in order to extract the same from the storage tank in particular when the rotor 2 is stationary and to supply the same to the respective dry gas seal 4. This takes place in particular during a cooling phase while the turbomachine is stationary.

According to a further advantageous development it is provided that into the stator 3 and/or housing cover at least one heating bore (not shown) is introduced to temperature-control the dry gas sealing system 1, in particular the dry gas seals 4, with the rotor 2 in the stationary state and thus prevent sticking of the same.

Accordingly, a dry gas sealing system 1 or a turbomachine with a dry gas sealing system 1 is proposed with the present invention, in the case of which the conditioning of the extracted process gas 11, namely the cleaning of the same, takes place with the rotor 2 or the rotor shaft, namely by a centrifugal device integrated in the rotor shaft that utilises the centrifugal forces for cleaning the process gas 11.

These centrifugal forces are present during the operation of the turbomachine with rotating rotor 2 so that external cleaning devices 13, such as for example filters, can be omitted. Altogether, the complexity, the susceptibility to faults and the cost of a dry gas sealing system 1 and thus of a turbomachine having such a dry gas sealing system 1 are reduced. According to the invention, existing turbomachines can be retrofitted or converted.

According to a further advantageous further development, the cleaning device 13 in the rotor 2 comprises a suitable washing device (not shown) with an external liquid, wherein this liquid is supplied for example via the inlet bore 22, optionally also with additional nozzle. The contaminated washing water is discharged via one or more outlet bores 23, 24.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A dry gas sealing system of a turbomachine, comprising:
 at least one dry gas seal configured to seal a rotor-side component of the turbomachine relative to a stator-side component of the turbomachine; and
 a cleaning device configured as a centrifugal device integrated in the rotor-side shaft of the turbomachine and configured to clean process gas extracted from the turbomachine, and supply the clean process gas to the at least one dry gas seal.

2. The dry gas sealing system according to claim 1, wherein the shaft comprises at least one inlet aperture for the process gas and at least one radial outlet bore for the seal gas for each dry gas seal.

3. The dry gas sealing system according to claim 2, wherein the shaft comprises at least one contaminant outlet aperture.

4. The dry gas sealing system according to claim 1, wherein the shaft comprises at least one contaminant outlet aperture.

5. The dry gas sealing system according to claim 1, further comprising an external storage tank for seal gas.

6. The dry gas sealing system according to claim 1, wherein the shaft comprises at least one heating bore arranged in the shaft.

7. The dry gas sealing system according to claim 1, wherein the turbomachine is a turbocompressor.

8. A turbomachine, configured as a turbocompressor, comprising:
   a stator;
   a rotor comprising a shaft; and
   a dry gas sealing system, comprising:
   at least one dry gas seal configured to seal a rotor-side component of the turbomachine relative to a stator-side component of the turbomachine; and
   a cleaning device configured as a centrifugal device integrated in the rotor-side shaft of the turbomachine and configured to clean process gas extracted from the turbomachine, and supply the clean process gas to the at least one dry gas seal.

9. The turbomachine according to claim 8, wherein the shaft comprises at least one inlet aperture for the process gas and at least one radial outlet bore for the seal gas for each dry gas seal.

10. The turbomachine according to claim 8, wherein the shaft comprises at least one contaminant outlet aperture.

11. The turbomachine according to claim 8, further comprising an external storage tank for seal gas.

12. The turbomachine according to claim 8, wherein the shaft comprises at least one heating bore arranged in the shaft.

13. The turbomachine according to claim 8, wherein the shaft comprises at least one contaminant outlet aperture.

* * * * *